B. KOEGEL.
Making Vinegar.
No. 26,271.
Patented Nov 29, 1859.
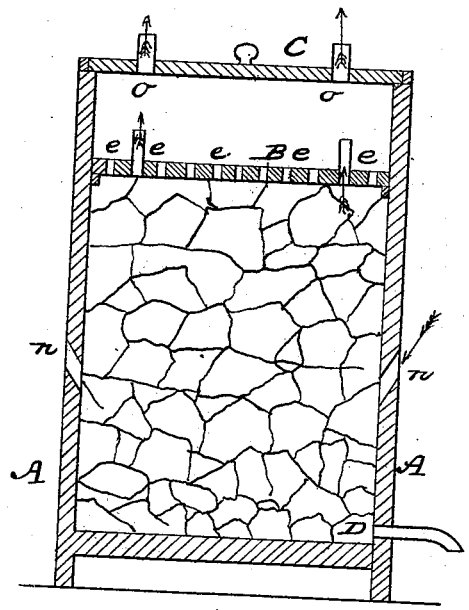
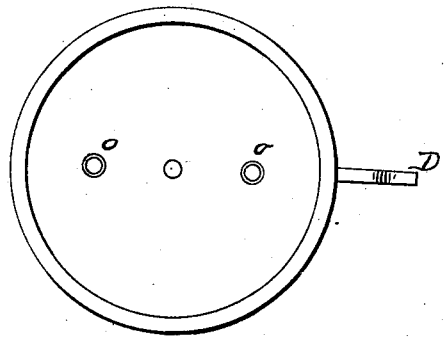

UNITED STATES PATENT OFFICE.

BERNHARD KOEGEL, OF NEW YORK, N. Y.

MANUFACTURE OF VINEGAR.

Specification of Letters Patent No. 26,271, dated November 29, 1859.

*To all whom it may concern:*

Be it known that I, BERNHARD KOEGEL, of the city, county, and State of New York, have invented a new and useful Improvement in the Manufacture of Vinegar or Acetic Acid; and I do hereby declare that the following is a full, clear, and exact description thereof, reference being had to the annexed drawings, in which—

Figure 1, is a vertical section. Fig. 2, a horizontal view of the apparatus which I employ for this purpose.

Similar letters of reference denote corresponding parts in these figures.

The nature of my invention consists in making acetic acid or vinegar rapidly in such a manner that small quantities of the same as required for domestic purposes may be produced in a small apparatus adapted for family use by employing pumice stone as a converting agent.

The present method of making vinegar consists in filling a tub or vessel with wood-coal or with shavings of wood, in pouring alcohol and water, wine, cider, molasses, or beer in it, leaving the same in the vessel about one hour, then straining it, then again pouring it into the tub and repeating the operation three or four times when after a period of from three to four hours the process is finished. The tubs or vessels required in this method as well as the quantity of wood coal, or wood shavings are necessarily large, as small quantities of these materials will not furnish the desired result.

To enable others skilled in the art to make and use my invention I will proceed to describe the manner of making compounding and using the same.

It consists in employing an apparatus substantially as represented in the annexed drawings filled with pumice stone.

The tub A made of wood or similar material has an inner cover B and an exterior cover C. The said interior cover B is pierced with holes *e*, *e*, *e* through some of which porous cotton wick or wooden pins are stuck and some of which contain glass tubes. The sides A of the vessel contain circumferential holes *n* the external cover C also contains two openings with glass tubes *o*, *o* and in this manner a circulation of air is effected. Near the bottom of the vessel a hole D is pierced for the reception of the syphon of discharge. The space between the bottom of the tub and the inner cover is filled in with pieces of pumice stone or an equivalent material, and the apparatus is then ready for use.

To make vinegar I pour wine of other alcoholic liquor into the tub in such a manner as to pass the same through the pores of the pieces of pumice stone within the tub. I leave it in the tub during about fifteen minutes and discharge it through the syphon, when the conversion of the original alcoholic liquid into vinegar will be completed. Vinegar may thus be produced in small quantities as required for family use, but the same method will also apply to the manufacture of large quantities for the wholesale trade.

The advantages derived from this improvement in the making of vinegar may thus be stated:

First. Small tubs may be used and thereby each family may be enabled to make its own vinegar.

Second. The vinegar produced by this improvement is better healthier and cheaper than the vinegar manufactured in the usual way.

Third. The pieces of pumice stone employed do not require as frequent renewals and replacement as wood coal or wood chips.

Fourth. The apparatus employed may be used or not used during a period of from three to five months without requiring any change or repair.

Having thus described my invention and the manner of applying the same, what I claim as new and desire to secure by Letters Patent of the United States is—

1. Converting wine of other alcoholic liquors rapidly into vinegar or acetic acid by means of pumice stone or its equivalent substantially as described.

2. And I also claim the tub or apparatus substantially as described when pumice stone is used in the same for the purpose as set forth.

Dated New York June 25, 1859.

BERNHARD KOEGEL.

Witnesses:
CHARLES WEHLE,
M. HAUG.